Aug. 8, 1967 K. N. KAROL 3,335,388

SHIELDED ELECTRICAL CONNECTION DEVICE

Filed May 13, 1965

3 Sheets-Sheet 1

INVENTOR.
KENNETH NORMAN KAROL
BY Curtis, Morris & Safford

INVENTOR.
KENNETH NORMAN KAROL
BY Curtis, Morris & Safford

Aug. 8, 1967 K. N. KAROL 3,335,388

SHIELDED ELECTRICAL CONNECTION DEVICE

Filed May 13, 1965

3 Sheets-Sheet 3

INVENTOR.
KENNETH NORMAN KAROL
BY Curtis, Morris & Safford

United States Patent Office 3,335,388
Patented Aug. 8, 1967

3,335,388
SHIELDED ELECTRICAL CONNECTION DEVICE
Kenneth Norman Karol, Harrisburg, Pa., assignor to AMP Incorporated, Harrisburg, Pa.
Filed May 13, 1965, Ser. No. 455,528
10 Claims. (Cl. 339—18)

ABSTRACT OF THE DISCLOSURE

A plugboard device is disclosed having a patchcord carrying board of insulating material with a thin sheet of conductive material bonded to one surface thereof and with the board and conductive material apertured to receive and engage the outer conductive shield of a patchcord. At each aperture the thin sheet of conductive material is made to extend inwardly a slight amount relative to the surface of the aperture in the board material. A patchcord is taught having an outer conductive and shielding member having resilient spring fingers carrying detents disposed around the periphery of its forward end and carrying therewithin a spring member engaging the spring fingers to bias such outwardly to maintain the patchcord against accidental displacement. The engagement of the spring member with the detent is at a point which is outside of the thin sheet of conductive material when the patchcord is seated within the board.

This invention relates to a device for making shielded electrical connections and particularly to a new type of plugboard construction and a new type of coaxial and shielded patchcord for use therewith.

*Background of the invention*

In U.S. Patent No. 2,939,100 to Wm. S. Watts, granted May 31, 1960, there is described a shielded plugboard utilizing nylon cells retained in a grid of conductive members to provide isolation between the electrical paths of the system. The Watts plugboard has proven to be quite adequate and has for a number of years been widely employed where the electrical system of use requires shielded signal paths. An alternative construction of the prior art utilizes a solid metal board either having dielectric inserts affixed therein or having shielded patchcords carrying dielectric inserts therewithin to isolate the signal conductor of the cord.

In certain system applications there is a requirement for a relatively large number of front boards for use with a single back board. This requirement generally arises where there is a need to very quickly change programs without having to stop and repatch the board of use; or it may arise where the changes in patchcord positions from program to program are considerable in number to increase the opportunity for error in patching. In both cases, the cost and size of the system is greatly increased.

A second problem affecting prior art plugboard systems is one of patchcord retention against accidental pull-out. In devices where the patchcoard is axially held by a thermoplastic member, the most frequent shortcoming is one of retention failure due to plastic flow and shrinkage in time or in the presence of changes in humidity or heat.

Finally, a problem affecting virtually all of the patchcords utilizing solid metal boards is that during use of the system in its closed position (post-patching, as it is called) there is a possibility that the center signal conductor of the patchcord can be momentarily shorted to the grounding plane represented by the metal of the front board. If this occurs false signals will be generated which can cause erroneous switching operations or electrical short circuits.

*Summary of the invention*

The present invention purports to solve the foregoing shortcomings by a plugboard system having a contact board construction sufficiently inexpensive to permit the use of a large number of front boards with a single back board in conjunction with a novel patchcord and front board construction permitting a high retention against accidental displacement of the patchcord and at the same time precluding accidental shorts during post-patching. It is another object of the invention to provide a new board construction which may be employed in the front and back bays of plugboard systems to provide shielding of the signal paths of the system and which includes an improved retention of the various contact members of the system. It is a further object of the invention to provide a novel patchcord construction which includes shielding and improved retention. A still further object is to provide a board construction designed to alleviate the problem of shorting in post-patching and adapted for use generally in shielded plugboards, fixed or movable, pinboards, and the like.

The invention achieves the foregoing objectives through a board construction comprised of a body of insulating material having bonded thereto a thin sheet of conductive material with both members apertured to receive and engage the outer conductive shield of a patchcord. The board body is adapted to be mounted with the insulating material thereof directed outwardly such that upon insertion of a patchcord it is not possible to accidentally short the signal conductor against the conductive portions of the board. This arrangement places the conductive sheet in a position to provide optimum retention of patchcords inserted within the board. A patchcord construction is featured including an outer conductive and shielding member having resilient spring fingers carrying detents disposed around the periphery of its forward end and in a preferred embodiment having a spring means within such member to support the resilient spring fingers outwardly to maintain retention against accidental displacement. The patchcord of the invention is coaxial and includes a termination of cable shielding and a termination of the central contact of the cable with continuous isolation between the inner and outer conductors of the cable.

*Component description*

Figures 1, 5, 6:
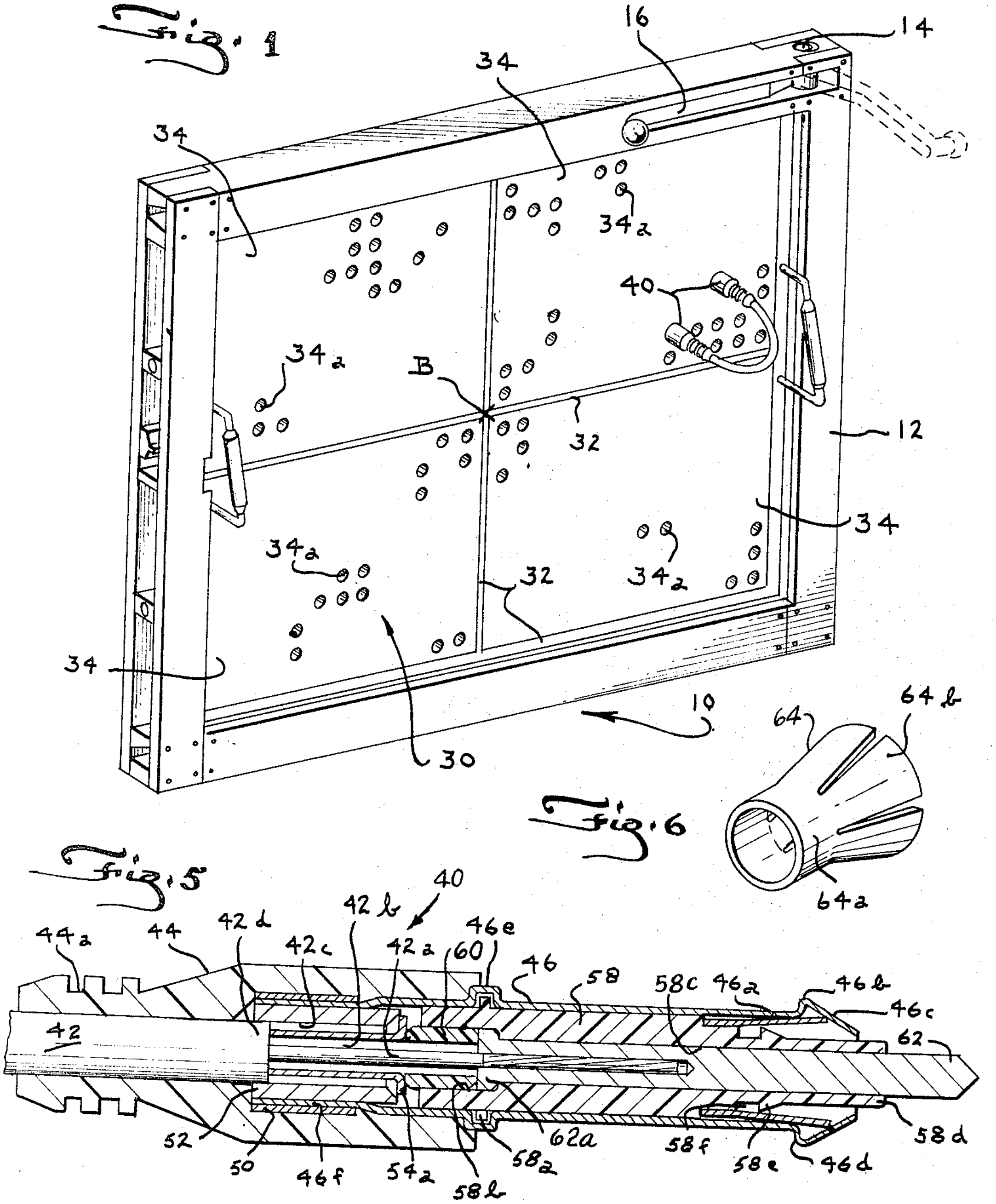
FIGURE 1 is a perspective of a plugboard system incorporating the present invention.
FIGURE 5 is a longitudinal section of the patchcord of the invention in one embodiment.
FIGURE 6 is a perspective of the helper spring utilized in the embodiment of FIGURE 5.
Figures 2, 3, 4:
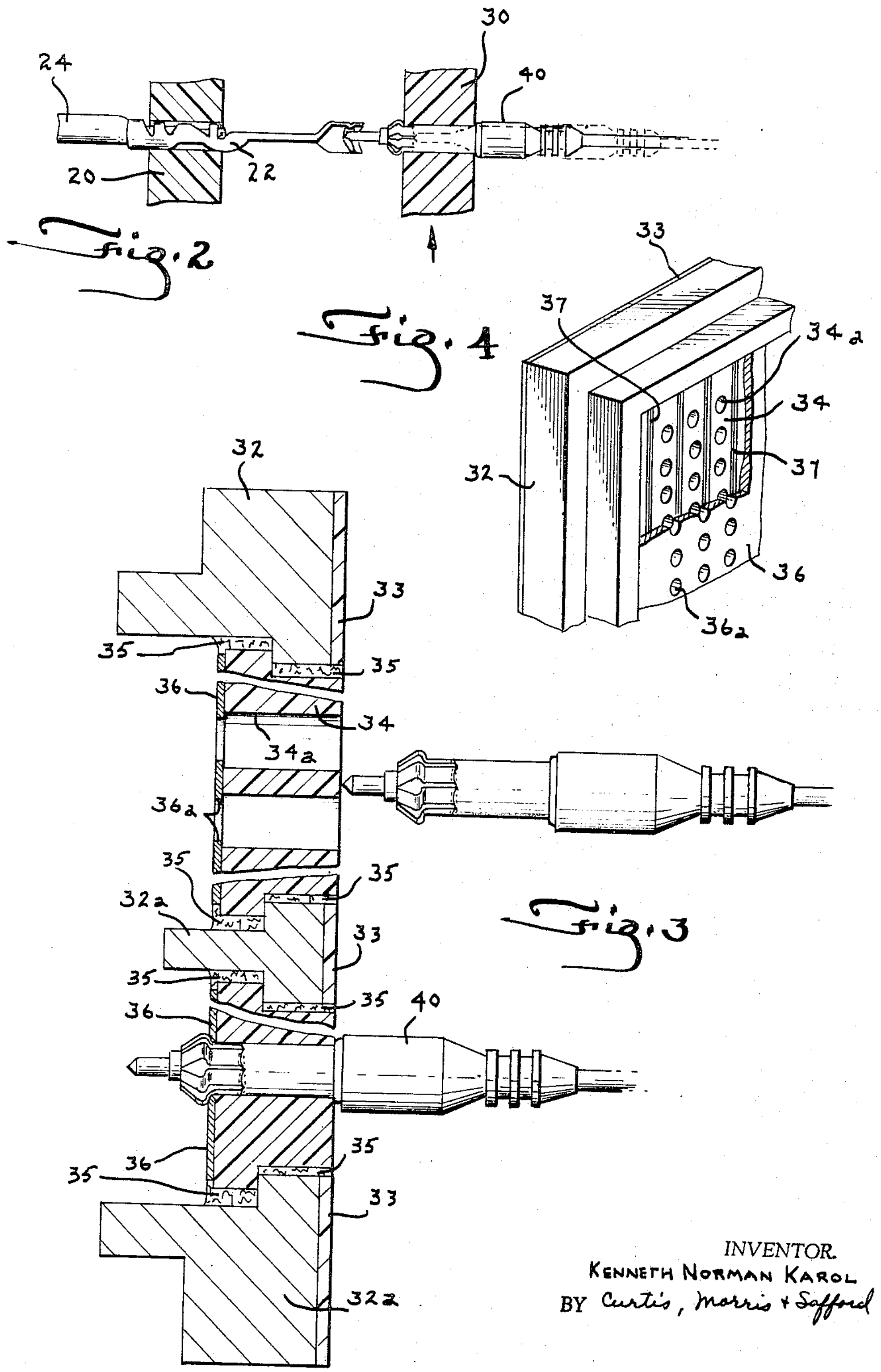
FIGURE 2 is a side view showing in part front and rear boards of the device of FIGURE 1 in section carrying contact members shown in plan and in engagement.
FIGURE 3 is a view showing the front board construction of the system of FIGURE 1 sectioned with patchcords shown disposed out of the board and fitted within the board to demonstrate the orientation of the board in use.
FIGURE 4 is a perspective of a corner of the board of FIGURE 3 with part of the board shielding removed to show construction detail.

Referring now to FIGURE 1, the plugboard assembly of the invention as shown as 10 to include a back bay outer frame 12 having at the right end a camming mechanism 14. This mechanism is driven to operate by a handle 16 which is rotated in the manner indicated by the dotted line from an outward position permitting a front board 30 to be removed or inserted to the inward position shown solidly wherein the front board is cammed into closure to effect switching. Reference may be had to U.S. Patent No. 2,882,508 to Wm. S. Watts for a description of the type of closure mechanism contemplated by the invention. In the assembly 10, the front board 30 carrying patchcords across its face like the one shown as 40 is positioned within the frame 12 which carries a rear board having contact springs with the patchcords out of contact with springs until it is desired to operate the system in closure through operation of handle 16. In FIGURE 2 a portion of the rear board is shown as 20, carrying a representative contact spring 22 into which is plugged an input or output lead 24. The rear board may be thought of as fixed. The front board 30 may be thought of as driven in the manner indicated by the arrow to a point wherein the center projecting pin of the patchcord contacts the end of spring 22 and wipes therealong in the manner described in the previously mentioned Watts patent. Alternatively, both boards may be thought of as fixed with the patchcord 40 inserted axially as indicated by the dotted line.

The front board of the assembly 10 is as indicated in FIGURES 1, 3 and 4 comprised essentially of a metallic frame 32 bonded to insulating board members 34 which each carry on the rear or inward surface a thin metal sheet member 36. The board members 34 are apertured as at 34*a* and the metal sheet member 36 is aperture as at 36*a*. These apertures are in substantial alignment and the apertures 36*a* are slightly smaller than apertures 34*a* so as to provide a flange or lip extending within the diameter of 34*a*. There is additionally provided on the outside surface of the frames 32 an insulation sheathing 33 bonded to the frame surface.

The insulating boards 34 were in an actual embodiment molded of a thermosetting plastic material and bonded to the metallic frame members 32 by cement shown as 35 utilizing the techniques described in copending applications S.N. 350,450 filed Mar. 9, 1964 and S.N. 379,995 filed July 2, 1964. Thereafter with the apertures 34*a* being masked, further cement shown as 37 in FIGURE 4 was applied to the inner face of the boards 32 and thin aluminum sheet material secured thereto. The insulation sheathing 33 was formed of phenolic strip cemented to the front surfaces of the frame members.

With the board constructed as indicated the entire front surface face is of insulating material and therefore any accidental contact of the front board as indicated in FIGURE 3 by the upper patchcord 40 will not result in shorting the signal conductor thereof to any grounded portion of the board. The conductive portions of the board are thus either completely to the outside of the outer frame or on the side of the board 30 opposite to patchcord insertion. As an important point, it will be noted from FIGURE 3 that the aperture 34*a* is of substantial length with the conductive sheet 36 being positioned at the exit end. This means that the patchcord signal carrying pin will be so positioned and aligned within 34*a* as to be blocked from touching 36 through an engagement with the edges of 36*a*. Even a substantial force tending to cock 40 will not cause the center pin of the patchcord to be shorted out because the arrangement of parts is such that when the patchcord is first inserted the tip of the patchcord is still removed from 36*a*. When the patchcord is partially inserted, solid portions of the outer shell of 40 are engaged with sufficient bearing contact with 34*a* to prevent cocking of the patchcord.

Upon full insertion of a patchcord within board 30 the outer resilient conductive portions of 40 will engage and contact the sheet 36 to effectively terminate the shielding of each patchcord cable in common with the shielding of all the other patchcords. In the embodiment shown in FIGURE 1 the boards and sheets are divided into four parts separated by portions of the frame 32. The individual sheets are accordingly bussed by conductive strips at the center as indicated by the schematic representation B.

As will be apparent from the foregoing description in conjunction with the drawings, the construction of the board of the invention is relatively simple when compared with the egg-crate nylon cell construction described in the first mentioned Watts patent. This means that the board is less expensive to manufacture. Aside from this the board of the invention has improved features assuring substantial rigidity against plastic flow, deformation or warping. As compared with the solid metal boards of the prior art, the present invention offers advantages through the insulation of all front surfaces and the aperture arrangement which precludes shorting of the center conductor of the patchboard as it is inserted within the board.

Turning now to a description of the patchcord utilized with the foregoing board, reference is made to FIGURE 5 showing the patchcord 40 terminated to a coaxial lead 42. The coaxial lead is standard; including a center conductor 42*a*, surrounded by a dielectric 42*b*, an outer conductive braid 42*c* and the outer protective insulating sheath 42*d*. The rear portion of patchcord 40 includes a plastic molded boot 44 having gripping ridges 44*a* on the outer end to facilitate insertion and withdrawal of the patchcord in use. The boot 44 extends forwardly to cover over the components of the patchcord employed to terminate the outer conductive braid of the cable.

Examining further the patchcord construction shown in FIGURE 5, there is provided an outer and generally cylindrical sleeve 46, having near its forward end a series of spring fingers 46*a* carrying detents 46*b* each having a forward surface 46*c* beveled inwardly and a rearward radial surface 46*d* joining the forward surface by a bend of close radius. As shown in FIGURE 1, the detents have a rounded configuration (in plan) to facilitate insertion. The springs are flat along their length and have a tapered transition portion joining the curvature. Extending back from the forward end of 40 and spaced from the surface 46*d* for a length approximating the thickness of the board 30 is a cylindrical portion of the sleeve of a diameter to slidingly fit within an aperture 34*a* of the board. At the rear of this portion is an outwardly directed flange 46*e* which operates as a stop to limit insertion of the patchcord within the board. To the rear of 46*e* is a further portion 46*f* which is adapted to be held inwardly by a band 50 continuous around its circumference to prevent sleeve 46 from relaxing or spreading. Within the portion 46*f* is a ferrule member 52 which is crimped inwardly to terminate braid 42*c* of the cable to a central eyelet member 54 fitted between the braid and the dielectric 42*b* of the cable. The eyelet has a turned out flange portion 54*a* which rests against an end face of the ferrule 52, which is, as shown, turned inwardly. This whole assembly, including ferrule 52 is crimped inwardly through forces applied through band 50 to terminate the braid to sleeve 46.

In the central forward portion of 46 there is a dielectric insert 58 having an outer diameter to fit tightly within 46 and having a flange portion 58*a* adapted to nest within the inner portion of 46*e* and hold the insert within the sleeve. The inner portion of 58 includes at the rear an enlarged bore 58*b* into which is fitted a further dielectric insert 60 adapted to engage at its rear end the flange 54*a* of the eyelet and at its forward end the rear surface of a central pin 62 of conductive material crimped to the center conductor 42*a* of the cable. The forward portion of bore 58*b* is reduced to catch the forward face of a flange 62*a* of the pin and hold such against displacement rearwardly to a point of contact with the outer conductive portions of the assembly. Forward of bore 58*b* is a further bore 58*c* into which pin 62 is fitted and supported coaxially of the outer sleeve 46. The forward end of 58 is relieved as at 58*d* and extends outwardly encompassing pin 58 to a point outside of the ends of fingers 46*a* to prevent the spring fingers from being inwardly displaced to contact pin 62 and short out the patchcord signal path. There is provided on 58 relieved portions shown as 58*e* and 58*f* to accommodate a helper spring fitted within 46. Fitted around 58*e* is one embodiment of the helper spring 64. The spring has a "crown" configuration as shown in FIGURE 6 including a rear cylindrical portion 64*a* and forwardly and outwardly projecting spring fingers 64*d* each having a width greater than radial spacing of spring fingers 46*a* and a diameter to bias the spring fingers outwardly. The spring 64 thus serves to increase the net force required to deflect the spring fingers 46*a* inwardly and serves to restore such spring fingers outwardly to retain the patchcord within the board after deflection during insertion.

In an actual assembly the sleeve 46 was made of brass sheet stamped and rolled to the configuration shown and the member 64 was made of spring steel. The ferrule 52 was made of soft copper and the band 38 was made of a malleable brass drawn into a cylindrical shape. The dielectric inserts 50 and 60 were of nylon and the boot was of polyvinyl chloride. The center pin 58 was of brass overplated with nickel and gold.

Figure 7:
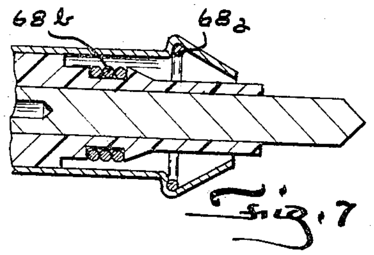
FIGURE 7 is a longitudinal section of the forward end of a patchcord in accordance with an alternative embodiment of the invention.
Figure 8:
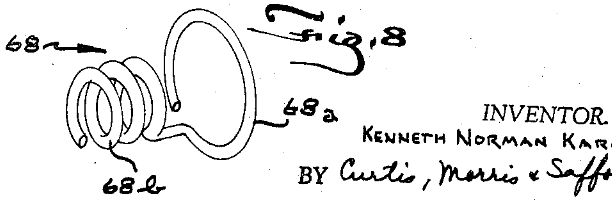
FIGURE 8 is a perspective of the helper spring utilized in the patchcord of FIGURE 7.

An alternative form of the patchcord of the invention is shown in FIGURE 7 wherein the helper spring is made of a stiff coiled wire. This version is shown as 68 and includes small turns 61*b* nested within the recess 58*f* of the dielectric insert with a large turn 68*b* extending forwardly and outwardly within the maximum inner diameter of the detent 46*b*. The turns 62*a* serve to hold and position the spring and the turn 62*b* serves to provide a radially developed force holding the detent as above described.

Figures 9, 10, 11:
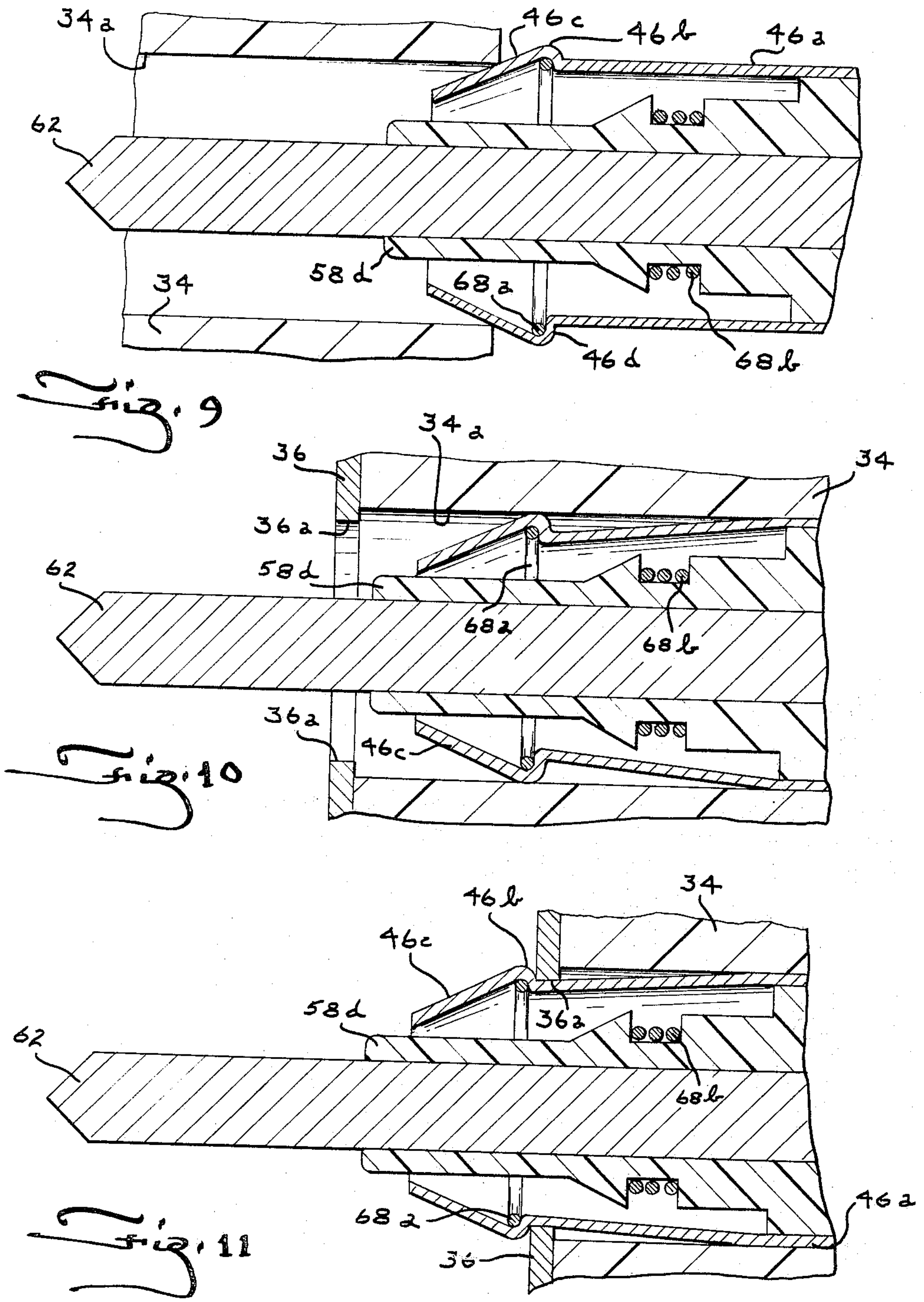
FIGURES 9–11 are partial sections showing portions of a front board and a portion of the forward end of the patchcord of FIGURE 7 in positions of initial entry into the board, fitted within the board and inserted through the board, respectively.

The general operation of both embodiments of the patchcord may be better appreciated from FIGURES 9, 10 and 11, which show the second alternative of FIGURE 7 relative to board 30; it being contemplated and understood that the description also applies to the embodiment of FIGURE 5. Upon initial insertion the spring fingers 46*a* by virtue of their forward beveled face 46*c* engage the edge of the aperture 34*a* and are cammed inwardly against the spring force of the fingers and against the spring force required to radially compress the spring turn 68*a*. Continued insertion of 40 will result in the spring fingers being further compressed inwardly to permit the patchcord to slide inwardly and along aperture 34*a*. The forward end 58*d* of the insulating insert serves to prevent the ends of the spring fingers from contacting the center pin 62 to short the cord. At the point of first insertion, as in FIGURE 9, or at a point of insertion slightly greater than that shown in FIGURE 9 the end of 62 is axially displaced from the metal sheet member 36 so that cocking or canting of the patchcord cannot short the signal conductor to the grounding plane. After the patchcord has been inserted to the point shown in FIGURE 10 a substantial length of the sleeve 46 will have been positioned within 34*a* such that the patchcord can no longer practically be cocked or canted to cause 62 to contact 36 through an engagement with the edge of the sheet at aperture 34*a*. With the patchcord insert as shown in FIGURE 10 the spring fingers and the spring portion 68*b* are compressed inwardly; the relief 58*e* in the dielectric insert permitting a cantilever operation of the spring fingers as biased by the spring 68. In the position shown in FIGURE 10 the springs are not completely compressed inwardly so as to permit a further inward movement upon engagement of the detent 46*b* with the aperture 36*a* which protrudes slightly inward of the surface of 34*a*. As this occurs the spring fingers are then fully compressed to permit the patchcord to be fully inserted in the board to a point wherein the flange 46*e* stops further insertion. At this point the detents 46*b* are as shown in FIGURE 11 fully through the sheet 36 and have snapped outwardly to latch the patchcord in position under the combined retaining force of both springs. Thereafter, the front board may be driven relative to the back board to effect an engagement between the contact pin 62 and the rear bay spring members 22 as indicated in FIGURE 2. In cases of post-patching this contact will occur upon axial insertion of the patchcord.

The spring system of the patchcord 40 as above described in conjunction with the angle of the rear face 46*d* of the spring fingers will prevent the patchcord from being accidentially dislodged from the board and at the same time permit the patchcord to be intentionally withdrawn. As should be apparent, the insertion force of the patchcord is less than the withdrawal force due to the configuration of the outer surface of the spring fingers.

The invention system has been described relative to a plugboard system having movable board members. In certain uses plugboard devices are made up in fixed systems wherein the front and rear boards are held rigidly together with no relative movement. It is contemplated that the invention may be incorporated into such systems with one portion being generally like the rear board having contact spring members therein and with the other portion being like the front board shown in FIGURE 3 used with the patchcord embodiments described.

Having described the invention in terms intended to teach its preferred mode of practice I now define my invention through the appended claims.

What is claimed is:

1. In a device for effecting selected closures of electrical circuit paths the combination comprising a first board carrying conductive spring contacts adapted to be connected to input and output leads, a second board of insulating material positioned in a generally parallel spaced relationship to said first board and apertured to receive conductive members inserted therein axially aligned wth the conductive spring contacts of the rear board, the said second board including on its inner surface a conductive sheet having apertures therein registered with the apertures of the second board, a conductive member adapted to be inserted within the second board apertures to engage and contact one of the spring contacts of the first board, the said conductive member having an outer conductive barrel portion of a diameter to slidingly fit within an aperture of a second board and having on the forward end thereof a series of peripherally disposed detents carried by cantilever springs having a relaxed outer diameter greater than the diameter of the aperture of the second board and a forward beveled face adapted to cam the said detents inwardly to permit insertion of said conductive member in said second board, said detents having a rear face generally radially disposed to latch against the edge of the conductive sheet and be electrically commoned thereto, a conductive pin coaxially disposed in said barrel portion and secured thereto by an insulating insert, a spring member within said barrel portion projecting radially outward to engage said detents and bias such outwardly, the said insulating insert having a portion extending over said pin and between said detents and said pin to prevent shorting of said detents to said pin upon inward movement during insertion of said conductive member in said second board.

2. The device of claim 1 wherein said conductive sheet is bonded to the said second board by cement or the like at points across substantially the entire inner face of the second board to provide an integral sheet-insulating board assembly.

3. The device of claim 1 wherein the said conductive member barrel is of a diameter to frictionally engage the aperture of the said second board and the said second board apertures are of a length relative to the length of the conductive member barrel to preclude shorting of the said pin to the said sheet during first insertion of said member in said second board.

4. The device of claim 1 wherein there is included a frame surrounding and supporting said second board and said frame includes a layer of insulating material on its outer surface whereby the entire outer surface of said second board and frame is of insulating material.

5. In an assembly for housing shielded circuit elements the combination including a board of relatively hard insulating material having an array of transverse apertures therein, the said board having a thickness to provide a substantial bearing area in said apertures for engagement and support of plugs inserted therein, a relatively thin sheet of conductive material bonded to one side of said board, said sheet including an array of apertures aligned with the board apertures and of a diameter slightly smaller than the board apertures, a plug member of a diameter to slidingly fit within said apertures, said member being adapted to be terminated to a coaxial lead and including an outer shield; an insulating sheath coaxially secured therein and a center conductive pin member supported in said sheath to extend outward of said shield, the forward end of said outer shield carrying a plurality of cantilever supported detents adapted to engage the edges of the apertures of the conductive sheet material means secured to said insulating sheath and within said outer shield operable to bias said detents outwardly through an engagement with said detents at a point toward the end thereof which is positioned on the outside of said thin sheet of conductive material when said plug member is seated within said board whereby to retain said plug in said board with the said pin member extending through said conductive sheet material for connection with further contact members.

6. In a patchcord adapted for use with shielded cable, the combination comprising an outer conductive shell adapted to be terminated at one end to the shielding of cable and having a rigid generally circular body portion adapted to support said patchcord in the aperture of a board member, the said shell having at its other end a plurality of cantilever members each carrying a detent adapted for radial movement to latch the cord within a board, a central conductive pin member coaxially supported by an insulating insert within said shell, the said pin member being adapted to be terminated to the center conductor of the shielded cable at one end and projecting outwardly of said shell at the other end, the forward end of the insulating insert being relieved from the said shell inner surface, a spring member fitted around the relieved portion of the insert including portions projecting forwardly and outwardly to engage the said detents and bias such outwardly.

7. The patchcord of claim 6 wherein said spring member portions are comprised of cantilever spring members.

8. The patchcord of claim 6 wherein said spring member portions are comprised of a hoop member adapted for radial spring movement.

9. The patchcord of claim 7 wherein said spring member is generally crown shaped with the said portion being relatively flat fingers of a width greater than the spacing between said cantilever members.

10. The patchcord of claim 6 whereiin said insert projects forwardly of said detents to insulate said pin member from being shorted by engagement with said detents.

References Cited

UNITED STATES PATENTS

| | | | |
|---|---|---|---|
| 2,506,615 | 5/1950 | Rosen | 339—18 X |
| 2,983,895 | 5/1961 | Pasik | 339—217 X |

MARVIN A. CHAMPION, *Primary Examiner.*

PATRICK A. CLIFFORD, *Examiner.*